Feb. 21, 1950 J. G. LEE 2,498,283
DRIVE FOR HELICOPTERS

Filed Jan. 30, 1945 4 Sheets-Sheet 1

INVENTOR

Feb. 21, 1950     J. G. LEE     2,498,283
DRIVE FOR HELICOPTERS

Filed Jan. 30, 1945     4 Sheets-Sheet 2

INVENTOR

Feb. 21, 1950   J. G. LEE   2,498,283
DRIVE FOR HELICOPTERS

Filed Jan. 30, 1945   4 Sheets-Sheet 3

INVENTOR
John G. Lee

Patented Feb. 21, 1950

2,498,283

UNITED STATES PATENT OFFICE 2,498,283

DRIVE FOR HELICOPTERS

John G. Lee, Farmington, Conn., assignor to United Aircraft Corporation, East Hartford, Conn., a corporation of Delaware Application January 30, 1945, Serial No. 575,343

6 Claims. (Cl. 170—135.4)

This invention relates to the driving means for helicopter rotors.

When the rotor of a helicopter is driven by an engine in the fuselage the torque applied to the fuselage must be counteracted by appropriate means, such as a torque rotor which is frequently mounted in the tail of the helicopter as remote as possible from the axis of the main rotor. A feature of this invention is a helicopter rotor drive which will eliminate the necessity for counteracting the torque.

Propulsion jets of gas may be used for driving the rotor, but it is difficult to maintain a gas-tight connection from the gas source in the fuselage through the rotor head to the individual rotor blade, and the duct losses are necessarily severe. A feature of this invention is a gas source so compact that it may be incorporated in the rotating structure. Another feature is a single bladed rotor in which the gas source is used as a counterbalance.

Since a conventional gas source such as an internal combustion engine driving a rotary compressor has rotating parts, the spinning of such a unit about the axis of the rotor may set up gyroscopic forces affecting the coning of the blade or the changes in pitch that may be desirable for flight control. A feature of the invention is a free-piston generator which forms the gas source and which, being free of rotating parts is not subject to gyroscopic forces.

The free-piston unit has the property of being able to change quickly the quantity or pressure of gas output because of the absence of any rotating elements, the inertia of which controls the rate of change of speed. A feature of this invention is a cycle control for the generator to adjust the output during each blade revolution. In this way, constant lift may be maintained independently of the movement of the blade relative to the surrounding air.

Another feature is the automatic control of the generator output dependent upon rotor position with a manual control of the discharge angle of the propulsive jet to adjust directional movement of the machine.

Other objects and advantages will be apparent from the specification and claims, and from the accompanying drawings which illustrate an embodiment of the invention.

Figure 1:
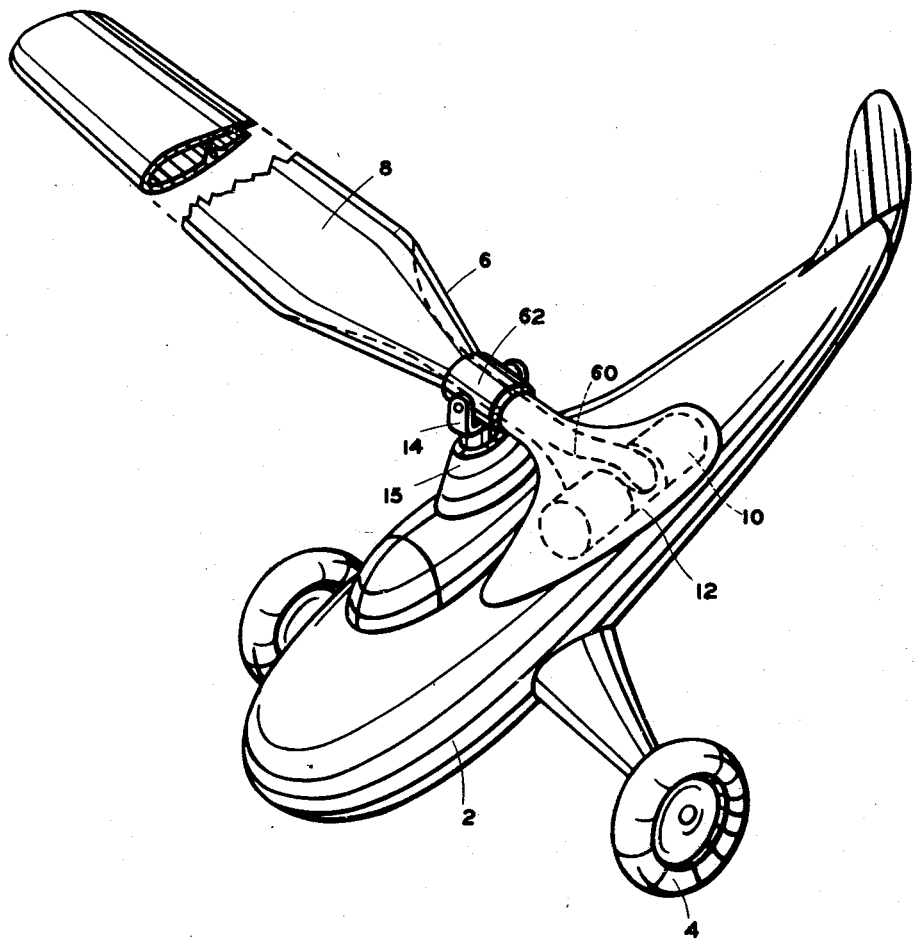
Fig. 1 is a perspective view of a helicopter showing the rotor and drive mechanism.

The helicopter includes a fuselage 2 having landing wheels 4 and a rotor 6. In the arrangement shown, the rotor includes a single blade 8 which is counterbalanced by a free-piston generator 10 in a cowling 12. The rotor is supported for oscillation about a horizontal axis by a yoke 14 mounted for rotation within the tower 15 which extends upward from the fuselage. The free-piston generator supplies hot gas under pressure which is delivered to the blade and is discharged in a jet for propelling the rotor.

Figure 2:
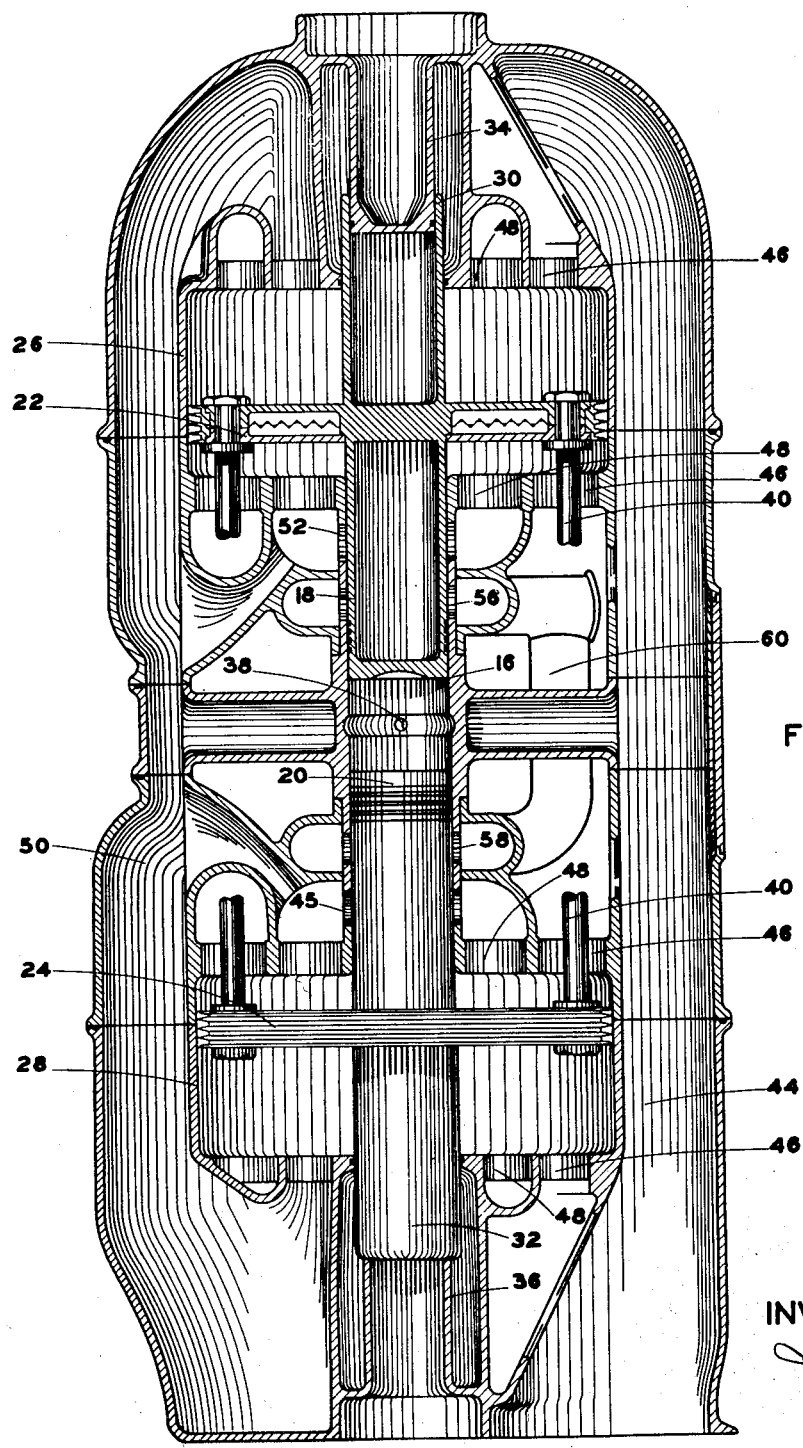
Fig. 2 is a sectional view of the free-piston unit.

With reference to Fig. 2, the generator may include an engine cylinder 16 having reciprocating pistons 18 and 20 to which compressor pistons 22 and 24 in cylinders 26 and 28 are integrally connected. Sleeves 30 and 32 attached to the compressor pistons reciprocate over stationary pistons 34 and 36 and form air spring cylinders.

The piston assemblies are moved apart by the burning of fuel injected into engine cylinder 16 by one or more nozzles 38. Air compressed in the air spring cylinders on the power stroke returns the piston assemblies. The piston assemblies are maintained always at equal distances from the center of the engine cylinder by a linkage which may include the racks 40 extending from the compressor pistons engaging opposite sides of a pinion, not shown.

Intake manifold 44 conducts air to intake valves 46 through which air alternately enters opposite ends of the compressor cylinders. The compressed air leaves the cylinders through discharge valves 48 also at opposite ends of the compressor cylinders and passes into the engine cylinder through scavenge manifold 50 and ports 52 and 54 which are uncovered by pistons 18 and 20 at the end of the power stroke, thereby permitting air to be blown through the engine cylinder. Gas within the engine cylinder discharges through exhaust ports 56 and 58 into exhaust manifold 60.

Figure 3:
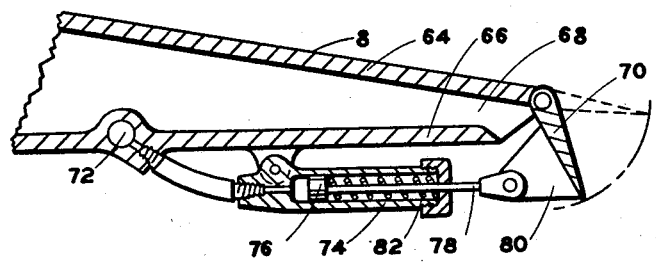
Fig. 3 is a sectional view through the blade of the rotor showing the angle of the gas discharge.

The exhaust manifold 60 conducts air through the sleeve 62 by which the rotor is supported and into the blade 8 which, as shown in Fig. 3, is hollow and acts as a duct to receive the exhaust gas from the generator. At the trailing edge of the blade 8 the upper and lower walls 64 and 66 converge to form a discharge nozzle 68 extending longitudinally of the blade and through which the gas is discharged as a propulsive jet. This nozzle may extend over all, or part, of the blade length. One of the walls, for example, the upper wall 64 has a pivoted flap 70 by which the angle of discharge of the gases may be controlled. By adjusting this flap from the full line position shown into the dotted line position, about an axis 10 parallel to the longitudinal axis of the nozzle, the angle of discharge may be varied to a substantial degree, thereby controlling the effective lift of the blade. The air flow over the blade is greatly affected by the angle of this discharge (as demonstrated experimentally) and the change in lift is much larger than the direct reaction of the jet.

Flap 70 may be controlled by fluid under pressure which is directed through a passage 72 in the blade to the end of a cylinder 74. A piston 76 in this cylinder is connected by a rod 78 to a projection 80 on the flap. The piston is normally urged by a spring 82 into a position to cause the flap to assume the downwardly extending position of Fig. 3. By admitting fluid under pressure through passage 72 the flap may be caused to move outwardly more or less into the dotted position shown. This may be done cyclically to equalize the lift over the swept disk, or for purposes of lateral and longitudinal control or as a means of increasing lift.

It may be advantageous to control the blade cyclically in order to maintain constant lift characteristics independently of the movement of the blade relative to the surrounding air. This may be done, for example, by controlling the quantity of gas delivered by the generator. Since the free-piston generator has no rotating parts it has the property of being able quickly to change its rate of operation for controlling the output of the generator, as for example, by adjustment of the quantity of fuel delivered to the generator.

Figure 4:
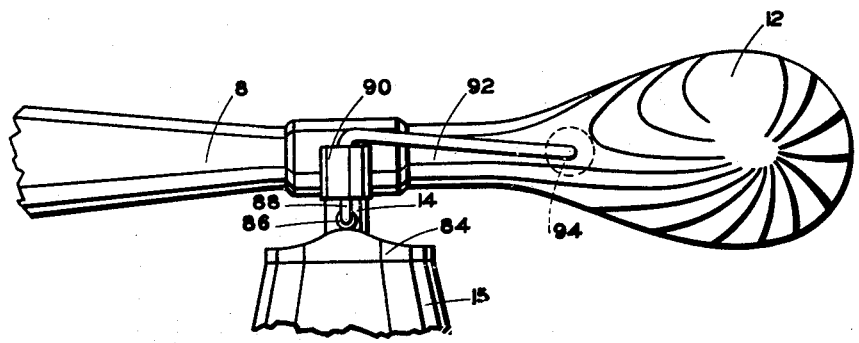
Fig. 4 is a fragmentary elevation view showing the arrangement for cyclically controlling the operation of the free-piston unit.

As shown in Fig. 4, the tower 15 may have mounted thereon a face cam 84 engaging with a follower 86 on the downwardly extending end of a rod 88. This rod is connected to a piston, not shown, reciprocating in a cylinder 90 mounted on the yoke 14. The end of cylinder 90 is connected by a flexible connection 92 to a cylinder 94 by which the quantity of fuel admitted to the generator is adjusted.

Figure 5:
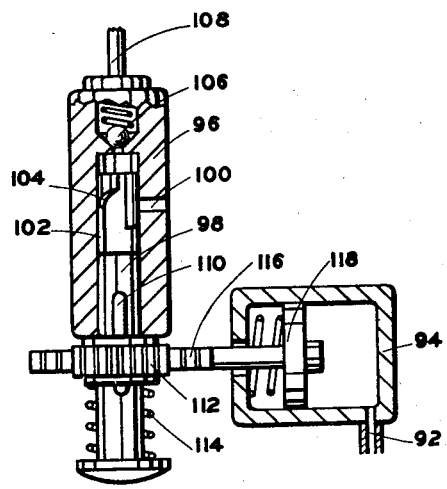
Fig. 5 is a sectional view through the injection device.

One structure by which the fuel quantity may be controlled is shown in Fig. 5 in which a pump cylinder 96 has a plunger 98 which, during the injection stroke, covers the inlet port 100. A groove 102, the upper wall 104 of which is arranged helically, is adapted to uncover the port 100 for terminating the injection. By angular adjustment of the plunger 98 the point at which the port 100 is uncovered may be adjusted, thereby to control the quantity of fuel injected. During the injection, fuel is pumped past a check valve 106 through a conduit 108 which connects with the injection nozzle 38, above referred to.

For turning the plunger 98 the latter has a key 110 engaging in a groove in a pinion 112 surrounding the plunger. A spring 114 holds the pinion in position against the casing 96 so that the plunger is free to reciprocate within the pinion. The pinion is turned by a rack 116 which engages the pinion and which carries at its outer end a piston 118 in the cylinder 94. Movement of piston 118 to the right, as shown, decreases the quantity of fuel in each injection stroke. As rod 88 is moved upward by cam 84, fluid within cylinder 90 is forced into cylinder 94, thereby moving the rack 116 to the left, in a direction for increasing the quantity of fuel delivered to the generator. Cam 84 is fixed so that the fuel adjustment occurs in timed relation to the turning of the rotor on its axis.

Figure 6:
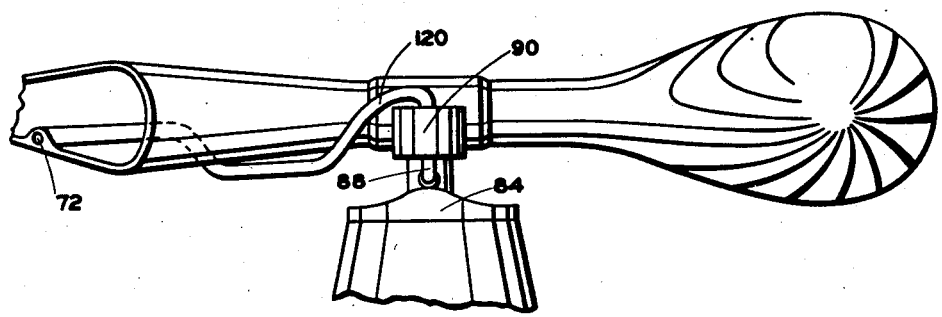
Fig. 6 is a fragmentary elevation view showing the cyclic control of the angle of gas discharge.

Instead of controlling the quantity of fuel and thereby controlling the quantity of power gas used for propulsion, the cyclic control may be accomplished by adjusting the angle of discharge of the gas. As shown in Fig. 6, the cylinder 90 instead of being connected to the cylinder 94, may be connected through a flexible connection 120 to the passage 72 by which control fluid is admitted to cylinder 74. Thus, as the rod 88 is moved upward by cam 84 fluid under pressure is conducted through passage 72 to the cylinder 74 to move the control flap into a more nearly horizontal position.

In addition to controlling the rotor cyclically, as above described, it may be advantageous to provide a manual control by which to obtain directional control of the helicopter. Thus, if the fuel supply is automatically controlled, the flap might be controlled manually from the pilot's seat within the fuselage. Instead of direct manual control for the flap or for the fuel quantity delivered to the generator it may be advantageous to mount the cam 84 on the well-known azimuth plate used in conventional helicopters for obtaining additional cyclic control by which to change the direction of flight of the helicopter, both horizontally and vertically.

It is to be understood that the invention is not limited to the specific embodiment herein illustrated and described, but may be used in other ways without departure from its spirit as defined by the following claims.

I claim:

1. An aircraft rotor including a blade, in combination with counterbalancing means for said blade including a generator supplying gas under pressure, said blade having a nozzle extending longitudinally of the blade adjacent its trailing edge through which the gas is discharged as a propulsive jet, means in the form of a vane extending from and pivotally supported along one longitudinal edge of the nozzle for controlling the angle of discharge of the gas from the nozzle and means for moving said vane about its pivotal axis.

2. An aircraft rotor including a blade, in combination with counterbalancing means for said blade including a generator supplying gas under pressure, said blade having a nozzle extending longitudinally of the blade adjacent its trailing edge through which the gas is discharged as a propulsive jet, means in the form of a vane extending from and pivotally supported on an axis parallel to one longitudinal edge of the nozzle for controlling the angle of discharge of the gas from the nozzle, and means for adjusting said vane about said axis.

3. An aircraft rotor including a blade, in combination with counterbalancing means for said blade including a generator supplying gas under pressure, said blade having a nozzle extending longitudinally of the blade adjacent its trailing edge through which the gas is discharged as a propulsive jet, means in the form of a vane extending from and pivotally supported on an axis parallel to one longitudinal edge of the nozzle for controlling the angle of discharge of the gas from the nozzle, means for moving said vane about its pivotal axis and means cooperating with said moving means for cyclically adjusting said vane.

4. An aircraft rotor including a blade, in combination with counterbalancing means for said blade including a generator supplying gas under pressure, said blade having a nozzle extending longitudinally of the blade adjacent its trailing edge through which the gas is discharged as a propulsive jet, means in the form of a vane extending from and pivotally supported on an axis parallel to one longitudinal edge of the nozzle for controlling the angle of discharge of the gas from the nozzle, means for moving said vane about its pivotal axis and means cooperating with said moving means for adjusting said vane in timed relation to the rotation of the rotor.

5. An aircraft rotor including at least one blade having a discharge nozzle through which gas is discharged as a propulsive jet, in combination with a free-piston generator supplying gas for the jet, said generator being mounted in and turning with the rotor, fuel supply means for the generator, and means responsive to turning of the rotor for controlling said fuel supply means.

6. An aircraft rotor including at least one blade having a discharge nozzle through which gas is discharged as a propulsive jet, in combination with a free-piston generator counterbalancing the blade and supplying gas for the jet, said generator including opposed reciprocating pistons each having an engine and compressor portion, and engine and compressor cylinders for the pistons, the air delivered by the compressor discharging through the engine cylinder for scavenging it, and the exhaust gas from the engine being the gas for the jet, the generator being positioned so that the direction of piston reciprocation is substantially tangential to the circle defined by the center line of the generator during rotation of the rotor.

JOHN G. LEE.

REFERENCES CITED

The following references are of record in the file of this patent:

UNITED STATES PATENTS

| Number | Name | Date |
| --- | --- | --- |
| 1,133,660 | Papin et al. | Mar. 30, 1915 |
| 1,519,444 | Fales et al. | Dec. 16, 1924 |
| 1,820,946 | Pitcairn | Sept. 1, 1931 |
| 1,897,092 | Weir | Feb. 14, 1933 |
| 1,982,969 | Stalker | Dec. 4, 1934 |
| 2,011,061 | Loescher | Aug. 13, 1935 |
| 2,142,601 | Bleecker | Jan. 3, 1939 |
| 2,292,288 | Pescara | Aug. 4, 1942 |
| 2,297,815 | Tidd | Oct. 6, 1942 |
| 2,371,687 | Gerhardt | Mar. 20, 1945 |
| 2,372,030 | Stalker | Mar. 20, 1945 |
| 2,397,357 | Kundig | Mar. 26, 1946 |
| 2,439,473 | Kalitinsky | Apr. 13, 1948 |

FOREIGN PATENTS

| Number | Country | Date |
| --- | --- | --- |
| 27,087 | Great Britain | of 1910 |
| 227,151 | Great Britain | Jan. 12, 1925 |
| 366,450 | Great Britain | of 1930 |
| 595,915 | Germany | Apr. 24, 1934 |